ately

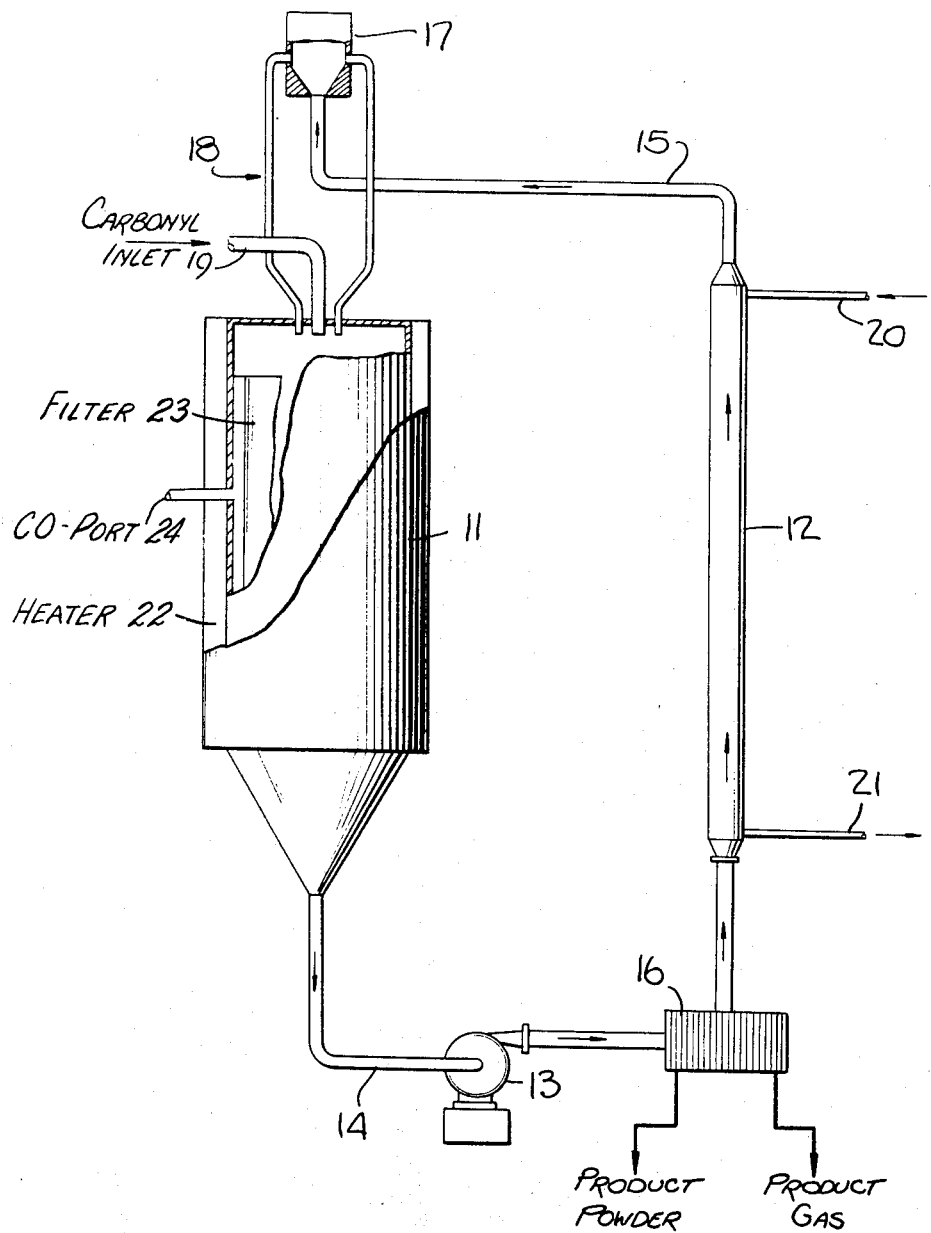

United States Patent Office 3,409,281
Patented Nov. 5, 1968

3,409,281
APPARATUS FOR DECOMPOSING METAL COMPOUNDS
Charles E. O'Neill, Upper Montclair, N.J., Michael D. Head, Port Colborne, Ontario, Canada, and Charles B. Goodrich, Huntington, W. Va., assignors to The International Nickel Company, Inc., New York, N.Y., a corporation of Delaware
Original application Dec. 4, 1964, Ser. No. 416,045, now Patent No. 3,323,903, dated June 6, 1967. Divided and this application Apr. 10, 1967, Ser. No. 646,783
4 Claims. (Cl. 266—20)

ABSTRACT OF THE DISCLOSURE

The disclosure is directed to apparatus for decomposing metal compounds, such as metal carbonyls, at a high production rate comprising a decomposing chamber, a heating chamber, conduit means connecting the heating chamber and the decomposing chamber, circulating means for circulating a stream of powdered material suspended in gas between the decomposing chamber and the heating chamber, an inlet leading to the decomposing chamber for admitting a stream of a metal compound to be decomposed, and mixing means for mixing the metal compound stream and a stream of powdered material suspended in gas adjacent the inlet to the decomposing chamber.

---

The present application is a division of our application Ser. No. 416,045, filed Dec. 4, 1964, now U.S. Patent No. 3,323,903, granted June 6, 1967.

The present invention is directed to a method and apparatus for decomposing metal carbonyls and, more particularly, to a method for decomposing vapors of metal carbonyls at high production rates.

The decomposition of metal carbonyls in the vapor phase to produce powders from the corresponding metals has long been known. The method which has been widely used for many years has involved a stationary decomposer wherein the metal carbonyl vapor, e.g., iron carbonyl or nickel carbonyl, is introduced into the top of a cylindrical chamber and wherein all the requisite heat to effect the decomposition of the carbonyl is introduced through the side walls of the chamber such that decomposition of the metal carbonyl to carbon monoxide and the corresponding metal takes place during passage of the vapor downwardly through the decomposing chamber. The product of such decomposition comprises a metal powder of high purity. However, the process is attended by a relatively low production rate and a high investment in plant would be needed to provide the multiplicity of units required to support a large tonnage operation. In addition, the powders produced tend to be quite fine and angular and such powders normally do not have the flow characteristics which are desired in some powder metallurgy and other applications involving the use of metal powder.

We have now discovered an improved method for the decomposition of metal carbonyls from the vapor state wherein a relatively high production rate of powder product is achieved and wherein the powder product has improved characteristics from the standpoint of flowability, etc., as desired in many powder metallurgical applications.

It is an object of the present invention to provide a method for decomposing metal carbonyl at high production rates of resultant metal powder.

It is a further object of the present invention to provide metal powder or metal-coated powder on a high tonnage basis as a product of the decomposition of the corresponding metal carbonyl.

It is another object of the invention to provide a circulating system for the decomposition of metal carbonyl at a high production rate of resultant metal.

It is still another object of the present invention to provide an apparatus especially adapted for the production of metal powder or metal-coated powder by the decomposition of metal carbonyl in a circulating system at a high production rate of metal.

Other objects and advantages of the invention will become apparent from the following description taken in conjunction with the accompanying drawing which illustrates a form of apparatus particularly applicable for the purpose of carrying out the present invention.

Broadly stated, the present invention contemplates a method for decomposing a metal carbonyl, of such elements as nickel, iron, cobalt, chromium, tungsten and molybdenum, on a substantially continuous basis at a high production rate of decomposed metal which comprises establishing a metal carbonyl decomposing zone and a powder heating zone, circulating a stream of hot powdered material suspended in a gas between and through said heating zone and said decomposing zone, introducing a stream of metal carbonyl to be decomposed into said decomposing zone concurrently with the hot suspended powdered material from said heating zone such that heat contained in said hot suspended powder stream entering said decomposing zone decomposes metal carbonyl in said decomposing zone. In continuous operation of the system, product powder and carbon monoxide advantageously are removed from said circulating stream at a rate substantially equal on a weight basis to the rate of introduction of metal carbonyl.

The invention also contemplates an apparatus for decomposing metal carbonyl at a high production rate comprising a decomposing chamber, a heating chamber, conduit means connecting said heating chamber and said decomposing chamber, circulating means located in said conduit means for circulating a stream of powdered material suspended in a gas between said decomposing chamber and said heating chamber and mixing means for mixing a stream of metal carbonyl and a stream of powdered material suspended in gas adjacent the points of entry of said streams into said decomposing chamber.

In carrying the invention into practice it is advantageous to conduct the decomposition of metal carbonyl introduced into said decomposing chamber substantially to completion therein. It is also advantageous to maintain the flow rate of powdered material suspended in the circulating gas, which generally is carbon monoxide, at a rate sufficiently high to maintain the powdered material in suspension in the gas. In order to carry out the decomposition of metal carbonyl to completion in the decomposer, the cross-sectional area of the decomposer may be enlarged as compared to the cross-sectional area of the circulating stream of powder-laden gas such that the arrangement of the nozzles employed to introduce materials into the decomposer is facilitated and the velocity of gas through the decomposer is reduced. Depending upon other practical operating conditions, including the particulate material content of the circulating gas, the feed rate of metal carbonyl, etc., an increase in cross-section in the decomposer chamber itself may be unnecessary.

It will be appreciated that the heat required to effect decomposition of metal carbonyl in the decomposer is primarily imparted by heat exchanger means, external to the decomposer, to the circulating stream of powdered material suspended in gas. The heat required for decomposing the metal carbonyl in the decomposer is interchanged between the heated particles and the carbonyl in the decomposer.

It will be appreciated that the introduction of suspended particles, which may be metallic powder or non-metallic powder having a melting point exceeding the temperature in the powder heating zone, greatly increases the heat capacity of the gas stream as compared to a similar stream of gas without the suspended particles. Satisfactory metal powders include nickel, iron, chromium, copper, aluminum, magnesium, silicon, etc., and satisfactory non-metallic powders include almina, magnesia, silica, thoria, graphite, refractory carbides, nitrides, silicides, borides, etc. In general, the particulate or powdered material employed in the circulating gas stream has a range of particle sizes such that it is suspendable in, and conveyable by, the gas stream. Thus, the particles in the circulating gas stream may have particle sizes in the range from submicron sizes up to about 50 microns, e.g., about 0.01 micron to about 20 microns, and advantageously about 0.1 to 10 microns. Particle loadings in the circulating gas stream can be quite high, e.g., up to about 40:1 on a weight basis depending upon practical operating conditions, including particle density, particle size, gas velocity in the circuit outside the decomposer, etc. Advantageously, the powder loading in the circulating carbon monoxide stream in the case of nickel or iron powder having a particle size of about 1 to about 10 microns is maintained at a weight ratio of powder to gas of at least about 1:1 up to about 40:1 or 50:1.

It will be appreciated that operation of the system to achieve metal coating of non-metallic powder will provide a circulating system wherein the great majority of the particles being circulated are coated with metal from the decomposition of metal carbonyl. Only the new feed to the system will be uncoated with metal. When it is desired to produce metal powder such as iron powder or nickel powder, the operation is initiated with a circulating stream of the desired metal powder whereupon plating of metal upon the heated metal powder occurs as the heated metal particles traverse the decomposer. In addition, further metal nuclei are formed in the decomposer. Accordingly, separation of the desired product can be obtained by classifying the metal powder borne in the circulating gas stream such that particles are removed therefrom when the desired particle size has been achieved. It is found that metal powders produced in this manner have improved flow characteristics as compared to the conventional type of metal powders derived from the decomposition of metal carbonyl.

As previously noted, decomposition of the metal carbonyl is effected substantially completely in the decomposer. In this way, the stream of powder-laden gas which is removed from the decomposer can be carried through the heat exchanger under conditions such that no plating of the heat exchanger and associated apparatus results. It will be appreciated that the production rate is dependent upon the heat supplied to the decomposer through the medium of the heated metal particles or metal-coated particles borne in the circulating gas stream. Accordingly, the rate of supply of metal carbonyl to be decomposed is coordinated with the heat content of the particle-laden gas stream which is mixed with the metal carbonyl in the decomposer. It will be appreciated that a substantial heat content remains in the heated particles leaving the decomposer and, accordingly, it is only necessary in the heat exchanger to reheat the circulated stream of particle-laden gas to the desired temperature for reintroduction of the stream into the decomposer.

The special method embodying the invention will now be described in conjunction with the accompanying figure wherein reference character 11 depicts a decomposing chamber and reference character 12 depicts a heat exchanger which may be, for example, made of a bundle of tubes so as to provide a high heat exchange area. Decomposer chamber and heat exchanger are connected by means of ducts 14 and 15 for circulating powder-laden gas therebetween. A fan 13 is located in duct 14 to pull a stream of powder-laden gas, e.g., carbon monoxide, from the bottom end of decomposer 11 and force the powder-laden stream upwardly through heat exchanger 12 and thence to the upper end of decomposer 11. Means 16 are located in duct 14, advantageously between fan 13 and the inlet for heat exchanger 12, for classifying the circulating powder and for separating product powder and excess carbon monoxide gas from the circulating system. Such classifying means may be located elsewhere in the circuit as desired in particular operations. The classifier means 16 can be operated to provide a cut of the coarser particles in the system such that particles are removed only when they are built up to a predetermined size. Alternatively, a powder product cut comprising a controlled mixture of particle sizes including the coarser particles can be taken. A distributor 17 is provided at the top of decomposer 11 to divide the incoming stream of powder-laden gas advantageously into a plurality of substantially equal streams which are led by ducts 18 to the top of decomposer 11. Metal carbonyl is introduced through port 19, which advantageously is water cooled to prevent decomposition of metal carbonyl prior to its entry into the decomposer 11, and mixing of the heated metal powder and the introduced stream of carbonyl is effected in the upper region of decomposer 11. Heat exchanger 12 is provided with a heating fluid inlet at 20 and a heating fluid outlet 21 for inlet and exhaust of heating fluid such as steam, mineral oil, diphenyl, mixtures of diphenyl and diphenyl oxide, a molten salt mixture, hot gas (such as flue gas), etc.

As an example of the invention involving operation with an apparatus as set forth in the attached drawing, the decomposer 11 has a cross-sectional area which is about 250 times as great as the cross-sectional area of the heat exchanger 12. A circulating charge of nickel powder having an average particle size of about five microns suspended in carbon monoxide is established in the system to provide a circulating rate of about 27,000 pounds per hour of nickel powder. The suspended stream is heated from a temperature of about 400° F. to 600° F. in the heat exchanger. About 1450 pounds per hour of nickel carbonyl vapor is introduced to the decomposer at 19 and is mixed with the distributed streams of hot gas-suspended nickel powder introduced concurrently therewith to effect substantially complete decomposition of the carbonyl during its downward passage through the decomposer. The operation is conducted on a substantially continuous basis with a production from classifier means 16 of about 500 pounds per hour of nickel powder. In this way, a circulating rate of nickel powder about 50 times as great as the nickel powder product rate is maintained. A nickel powder loading on a weight basis of about 18:1 is maintained in the gas stream and a gas velocity of at least about 60 feet per second, e.g., about 90 feet per second, is maintained in the circuit outside the decomposer. The minimum gas velocity in the system outside the decomposer is maintained at a value sufficient to maintain at least a major portion of the particles in suspension. Thus, when a major portion of light particles constitutes the powder load, a lower gas velocity can be employed than is necessary when the powder load comprises heavier particles.

As previously noted herein, a stream of metal carbonyl to be decomposed is introduced to the top of the decomposer and heat for the decomposition of the metal carbonyl is concurrently brought into the decomposer by means of a stream of heated particle-laden gas, e.g., carbon monoxide, which is led to the decomposer from the heat exchanger. When the metal carbonyl introduced through port 19 is nickel carbonyl or iron carbonyl, the carbonyl stream can be introduced through port 19 in the vapor form. For this purpose, a boiler not shown in the drawing is employed. In order to prevent decomposition of metal carbonyl within the introduction port 19, the introduction port advantageously is cooled, e.g., by water cooling. If desired, the metal carbonyl can be introduced in liquid form through the introduction port 19 and heat for vaporization and decomposition of the metal carbonyl can be provided from the stream of particle-laden carbon monoxide introduced concurrently therewith into the decomposer. This technique also provides an advantageous means for effecting the simultaneous decomposition of metal carbonyls including metal carbonyls which themselves occur in the solid state under ordinary conditions of temperature and pressure. For example, crystalline metal carbonyls such as the carbonyls of cobalt, tungsten, molybdenum and chromium are highly soluble in liquid carbonyls such as nickel carbonyl or iron pentacarbonyl and liquid mixtures of such carbonyls can be introduced into the top of the decomposer. In this manner, vaporization and decomposition of the liquid carbonyl mixtures are effected simultaneously at a high rate in the decomposer and powder products are produced which contain the corresponding metals in the same ratio as the metal ratio existing in the feed to the decomposer. This technique affords a most efficacious manner for producing metal powder containing metals such as cobalt, chromium, tungsten, or molybdenum alloyed or in highly intimate admixtures with metals such as nickel and/or iron.

It will also be appreciated that the method and apparatus described hereinbefore can be operated on a substantially continuous basis or batch-wise. In the instance of the production of chromium-, tungsten- and/or molybdenum-containing powders, batch-wise operation can be advantageous since the particles comprising the circulating powder load can be built up with chromium-, tungsten- or molybdenum-containing metal and when the desired amount of such metal has been deposited upon the particles within the circulating powder load the metal carbonyl feed can be changed from a feed containing the carbonyls of chromium, tungsten or molybdenum to a feed consisting only of the carbonyls of iron and/or nickel to provide a final coating or plating upon the circulating powder such that the powder is protected from oxidation of more oxidizable constituents after removal thereof from the apparatus.

As previously noted, the gas employed in the circulating powder-laden stream is generally carbon monoxide. In certain cases, up to major amounts, by volume, of other gases or gas mixtures which are essentially non-oxidizing to the metal product of decomposition, e.g., ammonia, nitrogen, hydrogen, a mixture of carbon dioxide and carbon monoxide, a mixture of hydrogen and water vapor, etc., can be employed.

Another technique for introducing solid metal carbonyls into the decomposer in accordance with the invention comprises introducing such carbonyls, e.g., the carbonyls of cobalt, chromium, tungsten and molybdenum, iron enneacarbonyl [Fe$_2$(CO)$_9$], iron tetracarbonyl $$[Fe(CO)_4]_3$$

cobalt ammonia cobalt carbonyl $$[Co(NH_3)_6][Co(CO)_4]_2$$

suspended as a fluidized stream in a non-oxixdizing gas such as carbon monoxide. It is to be understood that the term "metal carbonyl" employed herein includes substituted carbonyls decomposable to metal on heating, e.g., cobalt (II) hexammine bis tetracarbonyl cobaltate (—I)

$$[Co(NH_3)_6][Co(CO)_4]_2$$

nickel (II) hexammine bis tetracarbonyl hydrogen ferrate (—II) [Ni(NH$_3$)$_6$][Fe(CO)$_4$H]$_2$, iron (II) hexammine octacarbonyl diferrate (—I) [Fe(NH$_3$)$_6$][Fe$_2$(CO)$_8$]. Other compounds decomposable to metal by heat which may be treated in accordance with the invention include nickel formate, copper formate, chromium bis benzene, etc. If desired, a plurality of introduction ports may be employed for the purpose of introducing a plurality of metal carbonyls, or mixtures thereof, into the decomposer.

The compounds to be decomposed in accordance with the invention may be introduced into the decomposer as such or diluted with other materials such as carbon monoxide. For example, when iron carbonyl and nickel carbonyl are to be decomposed, they may be vaporized in the presence of carbon monoxide and introduced as a stream of vapor in concentrations of at least about 200 grams of metal as carbonyl per cubic meter of gas. The heat losses encountered in operating with lower concentrations of metal carbonyl may become so great that the process becomes uneconomic.

In general, the decomposer is operated in the temperature range of about 300° F. to 1000° F. in accordance with the invention. It is advantageous to introduce the metal carbonyl to be decomposed in the center of the decomposer top and to divide the heated particle-laden gas stream into a plurality of streams which are introduced through nozzles into the decomposer at points located advantageously substantially radially and equidistantly about the metal carbonyl introduction port or nozzle. In this manner, good mixing of metal carbonyl and heated particles is effected and decomposition takes place at a high rate without plating of the decomposer walls being encountered. Suitable deflection vanes adapted to direct the inlet powder streams and/or metal carbonyl vapor stream or streams toward each other may be associated with the nozzles employed to introduce the heated powder-laden gas streams into the decomposer.

It is to be seen from the foregoing description that the problems associated with the conventional metal carbonyl decomposer employed for the production of powder are obviated. Thus, in the conventional powder decomposer, all the heat for the decomposition is supplied through the side walls and the objective is to secure decomposition of metal carbonyl in the heated free space within the decomposer. This prior practice limited the quantity of heat which could be introduced into the decomposer and thereby severely limited the production rate of metal powder.

In addition, the metal particles produced are normally angular in nature and have a low apparent density. Furthermore, undesirable plating of metal may occur upon the hot walls of the decomposer.

In accordance with the present invention, the problem of supplying heat is separated from the operation of the decomposing chamber itself. Furthermore, heat supply at an entirely superior level of magnitude is attained. In addition, great flexibility in operating conditions is achieved. Thus, the powder loading in the circulating gas system, and its heat capacity, can be varied over wide limits in response to operating requirements. The capability for supplying heat at high input rates to the system is thus provided and a metal production rate of a new order of magnitude can be achieved. In addition, undesirable plating of metal upon the unheated walls of the decomposer chamber is obviated. It is also found that decomposition of metal carbonyl at a high rate is achieved which is attributable to the intimate mixing of heated powder, e.g., metal powder or metal-coated powder, with the metal carbonyl to be decomposed. In certain instances, a minor amount of heat sufficient to offset radiation losses can be introduced directly through the decomposer walls as, for example, by means of heater 22 in the drawing, in accordance with the invention. When this practice is adopted, it is advantageous to line the decomposer vessel with a filter screen illustrated by reference character 23 in the drawing and to introduce carbon monoxide under a slight positive pressure as by means of the port 24 in the drawing therethrough to eliminate plating problems.

As a further advantage, it is found that metal powder produced have greatly superior flow properties as compared to the flow properties of conventional grades of metal powder derived from the decomposition of metal carbonyl. For example, in one instance, it was found that nickel powder produced by means of the circulating system employing nickel powder-laden carbon monoxide as the heat exchange medium flowed readily through a funnel having an opening 0.22 inch in diameter and had an apparent density of about 3.5 grams per cubic centimeter. In contrast thereto, a conventional grade of carbonyl nickel powder would pass through a funnel having an opening of 0.5 inch only by means of tapping and had an apparent density of about 2.2 grams per cubic centimeter. In addition to the foregoing, it was found that the advantage of high purity associated with carbonyl nickel powder was still retained in the new powder.

The present invention makes possible the production of metal powder and metal-coated powder derived from the decomposition of metal carbonyl on a tonnage basis and makes possible the production of pure metal powders, alloyed powders, and metal-coated powders having controlled compositions and having improved physical properties for use in powder metallurgy and other industries. Although a vertical decomposer having an enlarged cross-section as compared to the cross-section of the heat exchanger and connecting conduits has been described herein by way of example, it is to be understood that the decomposer chamber or vessel may take other forms in which, for example, the cross-section of the decomposer is not enlarged as compared to the other passages in the circuit and in which materials pass horizontally therethrough. Thus, the decomposer may take the form of a series of tubes each of which is supplied with suspended heated particles and with metal carbonyl to be decomposed.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:
1. An apparatus for decomposing metal carbonyl at a high production rate of metal powder which comprises a decomposing chamber and a heat exchanger for heating particulate material suspended in gas, means for conducting heated particle-laden gas from said heat exchanger to means for distributing the conducted stream of heated particle-laden gas into a plurality of streams, nozzle means for introducing said distributed particle-laden gas streams into said decomposing chamber, nozzle means for introducing a stream of metal carbonyl into said decomposing chamber with said distributed particle-laden gas stream nozzle means being located substantially radially and equidistantly about said metal carbonyl introduction nozzle, whereby mixing of said streams is effected upon entry thereof into said decomposing chamber, and return means, including circulating means, for conducting a particle-laden gas stream from said decomposing chamber to said heat exchanger.

2. An apparatus for decomposing metal carbonyl at a high production rate of metal which comprises a decomposing chamber, a heat exchanger, means for conducting a stream of heated particles suspended in carbon monoxide gas from said heat exchanger to said decomposing chamber, means for introducing at least one stream of metal carbonyl into said decomposing chamber, mixing means for mixing said metal carbonyl and said heated particles adjacent the points of entry of said streams into said decomposing chamber, and return circulating means for conducting a stream of particles suspended in carbon monoxide gas from said decomposing chamber to said heat exchanger.

3. An apparatus for decomposing metal carbonyl at a high production rate of metal which comprises a decomposing chamber, a heat exchanger, means for conducting a stream of heated particles suspended in a gas from said heat exchanger to said decomposing chamber, means for introducing at least one stream of metal carbonyl into said decomposing chamber, mixing means for mixing said metal carbonyl and said heated particles adjacent the points of entry of said streams into said decomposing chamber, return gas conducting means for conducting particle-laden gas from said decomposing chamber to said heat exchanger, gas circulating means in said return gas conducting means, and particle classifying means in said return gas conducting means for classifying particle product and separating said product.

4. An apparatus in accordance with claim 3 wherein heating means are provided about the decomposer chamber to offset heat losses due to radiation, a filter screen lining is provided in said chamber and gas introduction means are provided to introduce gas into said chamber through said filter screen.

References Cited
UNITED STATES PATENTS

| | | | |
|---|---|---|---|
| 1,759,661 | 5/1930 | Muller et al. | 75—0.56 |
| 2,715,018 | 8/1955 | Lapple et al. | |
| 2,784,066 | 3/1957 | Forkel et al. | |
| 2,851,348 | 9/1958 | Oestreicher et al. | 75—0.5 |
| 2,890,348 | 6/1959 | Goins. | |
| 3,342,587 | 9/1967 | Goodrich et al. | 75—0.5 |

FOREIGN PATENTS

| | | |
|---|---|---|
| 549,669 | 12/1957 | Canada. |
| 695,925 | 8/1953 | Great Britain. |

J. SPENCER OVERHOLSER, *Primary Examiner.*

R. S. ANNEAR, *Assistant Examiner.*